No. 865,274.  
PATENTED SEPT. 3, 1907.

T. L. SMITH & C. A. BAKER.
WHEELBARROW WHEEL.
APPLICATION FILED MAR. 28, 1906.

2 SHEETS—SHEET 1.

Witnesses:  
C. H. Kenney,  
R. S. C. Caldwell.

Inventors:  
Thomas L. Smith,  
Charles A. Baker,  
By Benedict and Morsell,  
Attorneys.

THE NORRIS PETERS CO., WASHINGTON, D. C.

No. 865,274. PATENTED SEPT. 3, 1907.
T. L. SMITH & C. A. BAKER.
WHEELBARROW WHEEL.
APPLICATION FILED MAR. 28, 1906.
2 SHEETS—SHEET 2.
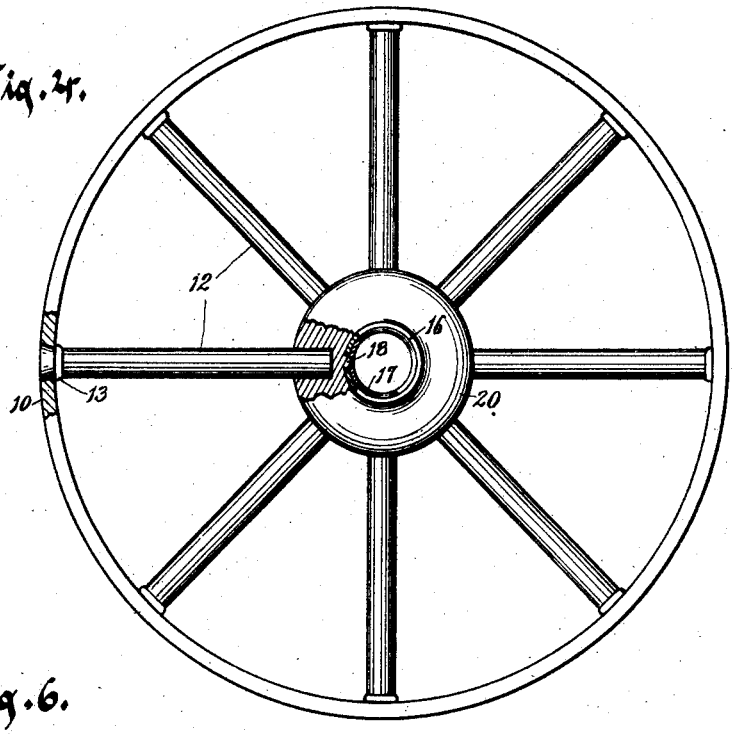
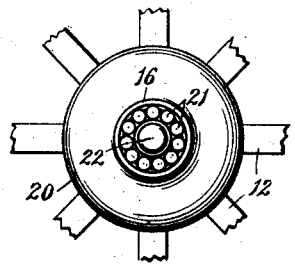
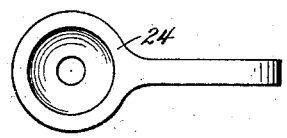
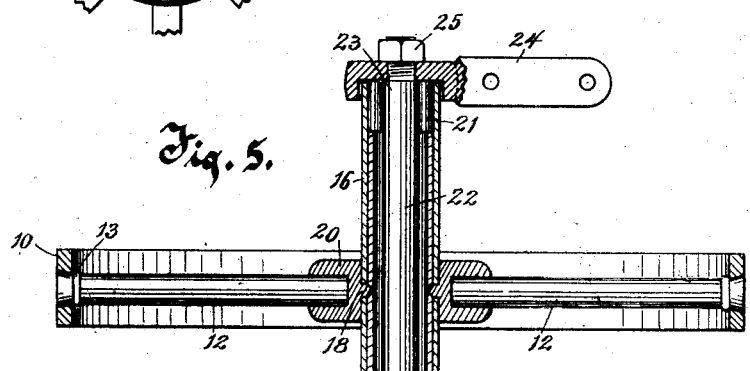

UNITED STATES PATENT OFFICE.

THOMAS L. SMITH AND CHARLES A. BAKER, OF MILWAUKEE, WISCONSIN, ASSIGNORS TO STERLING WHEELBARROW COMPANY, OF MILWAUKEE, WISCONSIN, A CORPORATION OF WISCONSIN.

WHEELBARROW-WHEEL.

No. 865,274.    Specification of Letters Patent.    Patented Sept. 3, 1907.

Application filed March 28, 1906. Serial No. 308,428.

*To all whom it may concern:*

Be it known that we, THOMAS L. SMITH and CHARLES A. BAKER, residing in Milwaukee, in the county of Milwaukee and State of Wisconsin, have invented new and useful Improvements in Wheelbarrow-Wheels, of which the following is a description, reference being had to the accompanying drawings, which are a part of this specification.

This invention relates to wheelbarrow wheels and has for its object to provide a wheel for wheelbarrows which will be simple in its construction and easily manufactured, while being strong and durable in use.

Another object of the invention is to produce a wheel for wheelbarrows in such a manner that the parts will be securely bound together against displacement and will provide a rigid structure throughout.

With the above and other objects in view the invention consists in the herein described wheelbarrow wheel, its parts and combinations of parts, and all equivalents.

Figure 1:
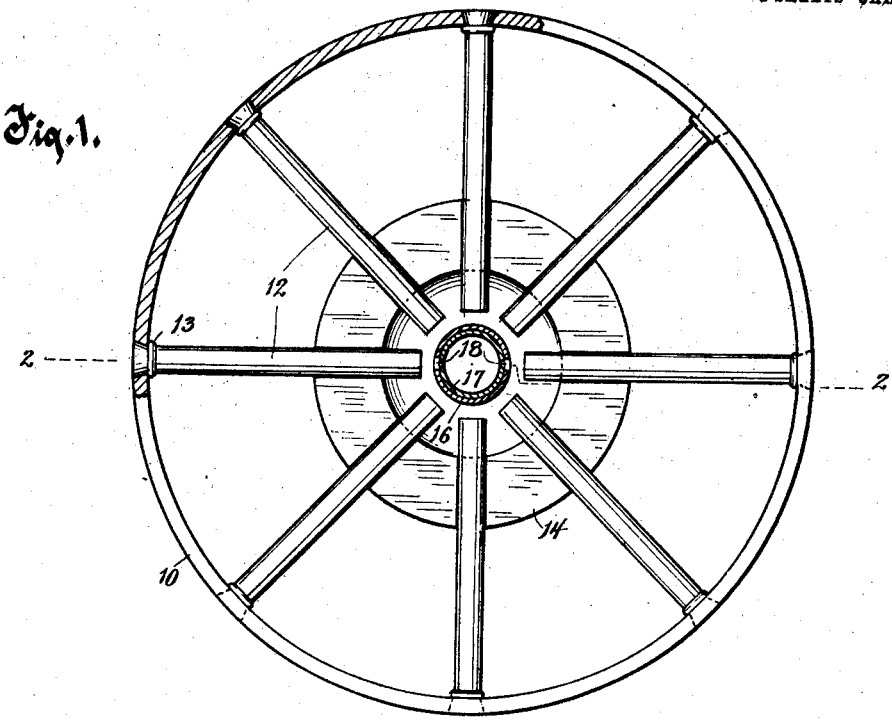
Figure 2:
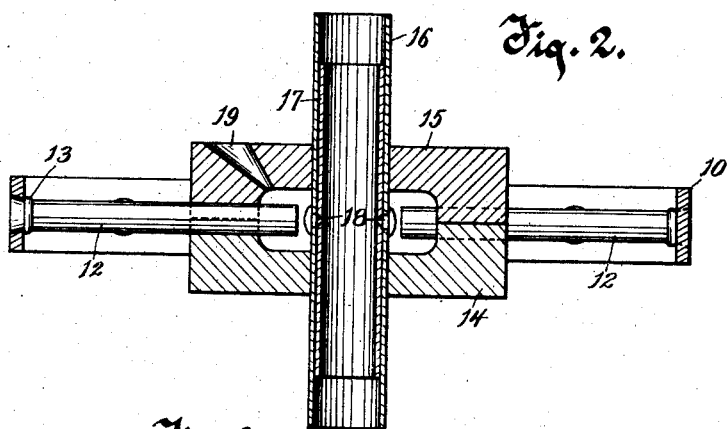
Figure 3:
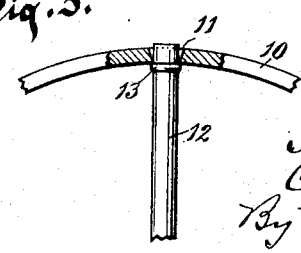

Referring to the accompanying drawings, in which like characters of reference indicate the same parts in the several views; Figure 1 is a plan view, partly in section, of portions of a wheelbarrow wheel arranged in a mold section preparatory to casting the hub thereon in accordance with this invention; Fig. 2 is a sectional view thereof on the line 2—2 of Fig. 1, the mold being completed and in position to receive the molten metal to form the hub; Fig. 3 is a sectional elevation of a portion of the rim and a spoke before the spoke is upset or riveted to the rim; Fig. 4 is a plan view of a wheelbarrow wheel constructed in accordance with this invention, parts being sectioned; Fig. 5 is a central transverse sectional view thereof with its associated parts assembled; Fig. 6 is a plan view of the hub portion of the wheel with the end bracket removed to show the position of the bearing rollers; and, Fig. 7 is a plan view of one of the end brackets.

In these drawings 10 represents a circular metal rim which is provided at intervals with tapering openings 11 to receive the ends of radial spokes 12. The spokes are formed of metal rods with annular shoulders 13 near their outer ends, the ends being inserted in the openings 11 and the shoulders bearing against the inner surface of the rim 10 at the smaller end of said openings. In this arrangement, the ends of the spokes are upset to fill in the tapering openings 11 and securely rivet the spokes to the rim.

The inner ends of the spokes 12 are fitted within radial grooves in a pair of corresponding mold sections 14 and 15, so as to extend into the internal molding space thereof, and a tubular sleeve 16 with a shorter sleeve 17 contained therein is placed through vertical registering openings in the mold sections, in an axial position with relation to the remainder of the wheel. The two tubular sleeves 16 and 17 have drill-holes 18 at their medial portions which register with each other, and which are centrally located within the internal molding space of the mold.

The upper mold section, 15, is provided with an inlet opening or gate 19 through which molten metal may be poured to fill the internal molding space of the mold and surround the inner ends of the spokes 12 and enter the registering drill-openings 18 to firmly lock the two sleeves 16 and 17 together. The metal thus molded forms a hub 20, which on cooling contracts, and as it is firmly attached to the ends of the spokes, in doing so it serves to tighten said spokes, giving them considerable tension, as their riveted connection with the rim at their outer ends will not permit their movement with relation thereto. The cooling of the cast hub 20 therefore produces an even tension on all of the spokes and gives rigidity to the whole wheel structure, the sleeves 16 and 17 being firmly held in their axial position and securely locked together in their proper relations. The inner tubular sleeve 17 is made shorter than the outer tubular sleeve 16, in order to provide an internal shoulder near each end of said outer sleeve to confine series of bearing rollers 21 in place at the ends of a fixed shaft 22 on which they bear, said rollers also bearing on the ends of sleeve 16 to constitute anti-friction bearings for the wheel. The shaft 22 has shoulders 23 near its ends against which are clamped end brackets 24 by means of nuts 25 threaded on the ends of the shaft. The end brackets 24 have cup shaped sockets to fit over the ends of the sleeve 16 and form dust proof connections therewith. The end brackets 24 are adapted to be secured to the front ends of the handle members of a wheelbarrow in the usual manner.

The wheelbarrow wheel constructed in accordance with this invention is very strong and rigid in its construction, while being simple and inexpensive to construct, and has dust proof anti-friction bearings which are strong and durable and highly efficient.

What we claim as our invention is:—

1. A wheelbarrow wheel, comprising a rim, spokes connected thereto, a tubular sleeve to which the spokes are connected, a second tubular sleeve shorter than the first mentioned sleeve and fitting therein to strengthen it and form internal shoulders, a shaft passing through the sleeves, and rollers confined between the shaft and the first mentioned sleeve and held in position by the shoulders formed by the inner sleeve.

2. A wheelbarrow wheel, comprising a rim, spokes connected thereto, a tubular sleeve to which the spokes are connected, a second tubular sleeve shorter than the first mentioned sleeve and fitting therein to strengthen it and form internal shoulders, means for connecting the two sleeves together, a shaft passing through the sleeves, and rollers confined between the shaft and the first mentioned sleeve and held in position by the shoulders formed by the inner sleeve.

3. A wheelbarow wheel, comprising a rim, spokes connected thereto, an axially disposed tubular sleeve, a cast hub connecting the sleeve with the spokes and giving tension to the spokes, a second tubular sleeve shorter than the first mentioned sleeve and fitting therein to strengthen it and form internal shoulders, said tubular sleeves having registering openings into which the metal of the cast hub projects to lock them together, a shaft passing through the sleeves, and rollers confined between the shaft and the first mentioned sleeve and held in position by the shoulders formed by the inner sleeve.

4. A wheelbarrow wheel, comprising a rim, spokes connected thereto, an axially located sleeve, another sleeve fitting therein, both sleeves being provided with registering openings, and a cast hub connecting the first mentioned sleeve with the spokes and giving tension to the spokes and entering the registering openings of the sleeves to lock the sleeves together.

5. A wheelbarrow wheel comprising a rim, spokes connected thereto, a cylindrical tubular outer sleeve to which the spokes are connected, a cylindrical tubular inner sleeve shorter than the outer sleeve and fitting therein, being spaced from the ends of the outer sleeve, a shaft passing through the sleeves without contacting therewith, and rollers seated in the roller casings formed by the ends of the outer sleeve and bearing on said casings and the shaft with their ends bearing on the ends of the inner sleeve.

6. A wheelbarrow wheel, comprising a metal rim having tapering openings therein, spokes provided with shoulders fitting against the rim and having their ends upset within the tapering openings to rivet them to the rim, an axially located sleeve, a shorter sleeve centrally located therein, said sleeves having registering openings, a cast hub connecting the spokes with the first mentioned sleeve to give tension to the spokes and entering the registering openings of the sleeves to lock the sleeves together, a shaft passing through the sleeves, bearing rollers between the shaft and the first mentioned sleeve and confined in position by the inner sleeve, end brackets having cup shaped sockets fitting over the ends of the outer sleeve to form dust proof connections therewith, shoulders on the shaft, and nuts threaded on the ends of the shaft for clamping the end brackets against the shoulders.

In testimony whereof, we affix our signatures, in presence of two witnesses.

THOMAS L. SMITH.
CHARLES A. BAKER.

Witnesses:
R. S. C. CALDWELL,
ANNA F. SCHMIDTBAUER.